(12) United States Patent
Chih et al.

(10) Patent No.: US 11,347,461 B1
(45) Date of Patent: May 31, 2022

(54) SYSTEM AND METHOD FOR ADJUSTING EXTENDED DESKTOP MONITOR SETTINGS BASED ON ACOUSTIC ANALYSIS OF AUDIO EMITTED FROM A SPEAKER OF AN EXTENDED DESKTOP MONITOR

(71) Applicant: Dell Products L.P., Round Rock, TX (US)

(72) Inventors: Yi Te Chih, New Taipei (TW); Jace W. Files, Round Rock, TX (US); Chiu Jung Tsen, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/149,974

(22) Filed: Jan. 15, 2021

(51) Int. Cl.
*G06F 3/14* (2006.01)
*H04R 3/00* (2006.01)
*G10L 25/51* (2013.01)
*H04R 1/02* (2006.01)
*H04R 1/40* (2006.01)

(52) U.S. Cl.
CPC ............ *G06F 3/1423* (2013.01); *G10L 25/51* (2013.01); *H04R 1/028* (2013.01); *H04R 1/406* (2013.01); *H04R 3/005* (2013.01); *H04R 2499/15* (2013.01)

(58) Field of Classification Search
CPC ....... G06F 3/1423; G10L 25/51; H04R 1/028; H04R 1/406; H04R 3/005; H04R 2499/15
See application file for complete search history.

(56) References Cited

U.S. PATENT DOCUMENTS

2019/0163432 A1* 5/2019 Files ...................... G06F 3/147

* cited by examiner

*Primary Examiner* — Andrew L Sniezek
(74) *Attorney, Agent, or Firm* — Terrile, Cannatti & Chambers; Stephen A. Terrile

(57) ABSTRACT

Methods, systems, and computer-usable medium are disclosed for implementing automated adjustment of extended desktop monitor configuration settings in an information handling system (IHS) based on acoustic analysis of audio emitted from a speaker of an extended desktop monitor and received at multiple microphones of the IHS. In certain embodiments, the multiple microphones are in fixed alignment with a built-in monitor of the IHS. As such, the audio received at the multiple microphones can be used to determine the position of the extended desktop monitor with respect to the built-in monitor. Various embodiments include corresponding computer-implemented methods, computer systems, apparatus, and computer programs recorded on one or more non-transient computer storage devices.

20 Claims, 10 Drawing Sheets

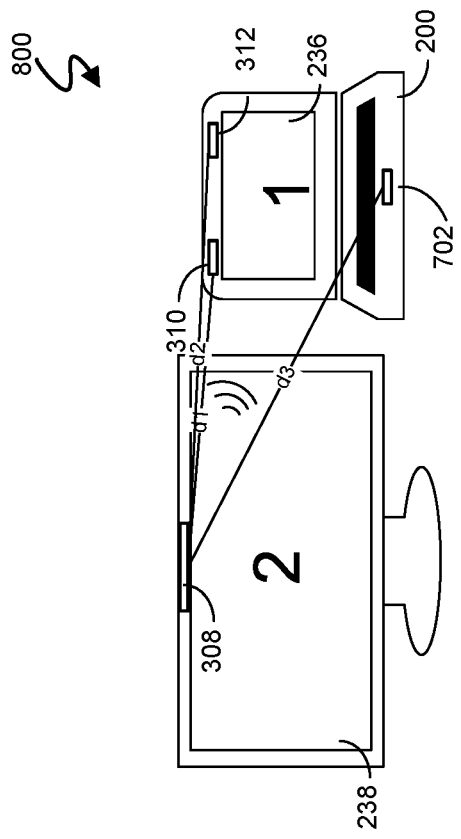
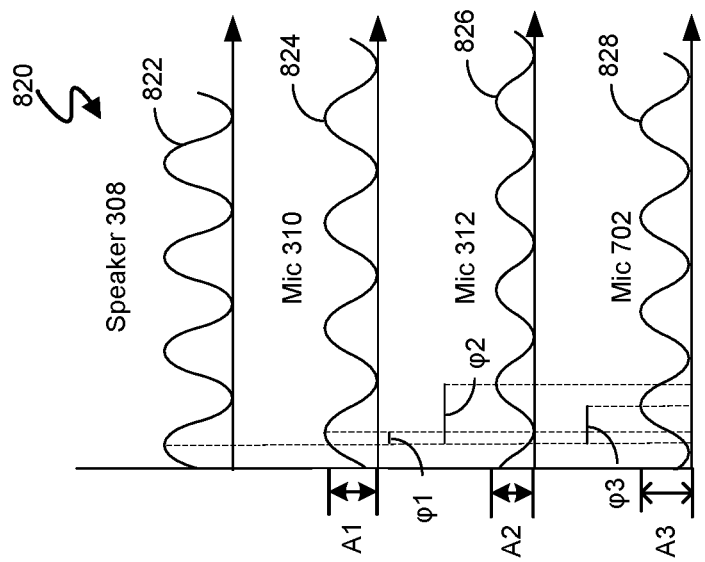
*Figure 8*

SYSTEM AND METHOD FOR ADJUSTING EXTENDED DESKTOP MONITOR SETTINGS BASED ON ACOUSTIC ANALYSIS OF AUDIO EMITTED FROM A SPEAKER OF AN EXTENDED DESKTOP MONITOR

BACKGROUND OF THE INVENTION

Field of the Invention

The present invention relates to information handling systems. More specifically, embodiments of the invention relate to an information handling system configured to adjust extended desktop monitor settings based on an acoustic analysis of audio emitted from a speaker of an extended desktop monitor.

Description of the Related Art

As the value and use of information continues to increase, individuals and businesses seek additional ways to process and store information. Information handling systems (IHS) may be used for this purpose. An IHS generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Also, information handling systems may include various hardware and software components that may be configured to process, store, and communicate information and may include one or more computer systems, data storage systems, and networking systems.

IHS are often capable of providing a video output to multiple monitors in an extended monitor configuration. Typically, the extended monitor configuration is set up by manually setting a display configuration application associated with the IHS operating system. However, some extended monitor configurations may include a monitor (e.g., a laptop display) that is frequently moved with respect to other monitors of the extended monitor configuration, thereby requiring the user to manually adjust the extended monitor positions in the extended desktop monitor configuration settings each time the monitor is moved relative to other monitors in the configuration.

SUMMARY OF THE INVENTION

A system of one or more computers can be configured to perform particular operations or actions by virtue of having software, firmware, hardware, or a combination of them installed on the system that in operation causes or cause the system to adjust extended desktop monitor configuration settings for positioning of extended monitors based on an acoustic analysis of audio emitted from speakers of the extended monitors and received at multiple microphones of an information handling system. One general aspect is directed to a computer-implemented method that includes detecting an event indicating that a position of at least one monitor relative to a position of at least one other monitor is to be determined, where the at least one monitor includes at least one speaker, and the at least one other monitor is configured in an information handling system having at least two microphones proximate the at least one other monitor. The method also includes driving the at least one speaker with an acoustic signal, receiving the acoustic signal at the at least two microphones, and analyzing the acoustic signal received at each of the at least two microphones from the at least one speaker. Based on the analysis, a relative position of the at least one monitor relative to the at least one other monitor is determined. Extended desktop monitor configuration settings of the information handling system are adjusted to position the at least one monitor and the at least one other monitor in the relative position in an extended desktop monitor configuration. Other embodiments include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 depicts another physical arrangement and corresponding acoustic positioning of an extended desktop monitor, where the laptop computer uses an additional microphone in the positioning operations.

DETAILED DESCRIPTION

A system, method, and computer-readable medium are disclosed for automatically adjusting the position of monitors in the extended desktop monitor configuration settings of an information handling system (IHS), such as a laptop computer. Certain aspects of the invention reflect an appreciation that a speaker of an external monitor can be driven by the acoustic output of the laptop computer to determine the position of the external monitor. The acoustic output from the external display monitor speaker may be received by at least two microphones (typically proximate to the laptop display) of the laptop and analyzed to determine the relative position of the external display monitor to the laptop monitor. The laptop computer's extended desktop monitor configuration settings may be adjusted based on the determination of the relative position of the laptop monitor and the external monitor.

Figure 1:
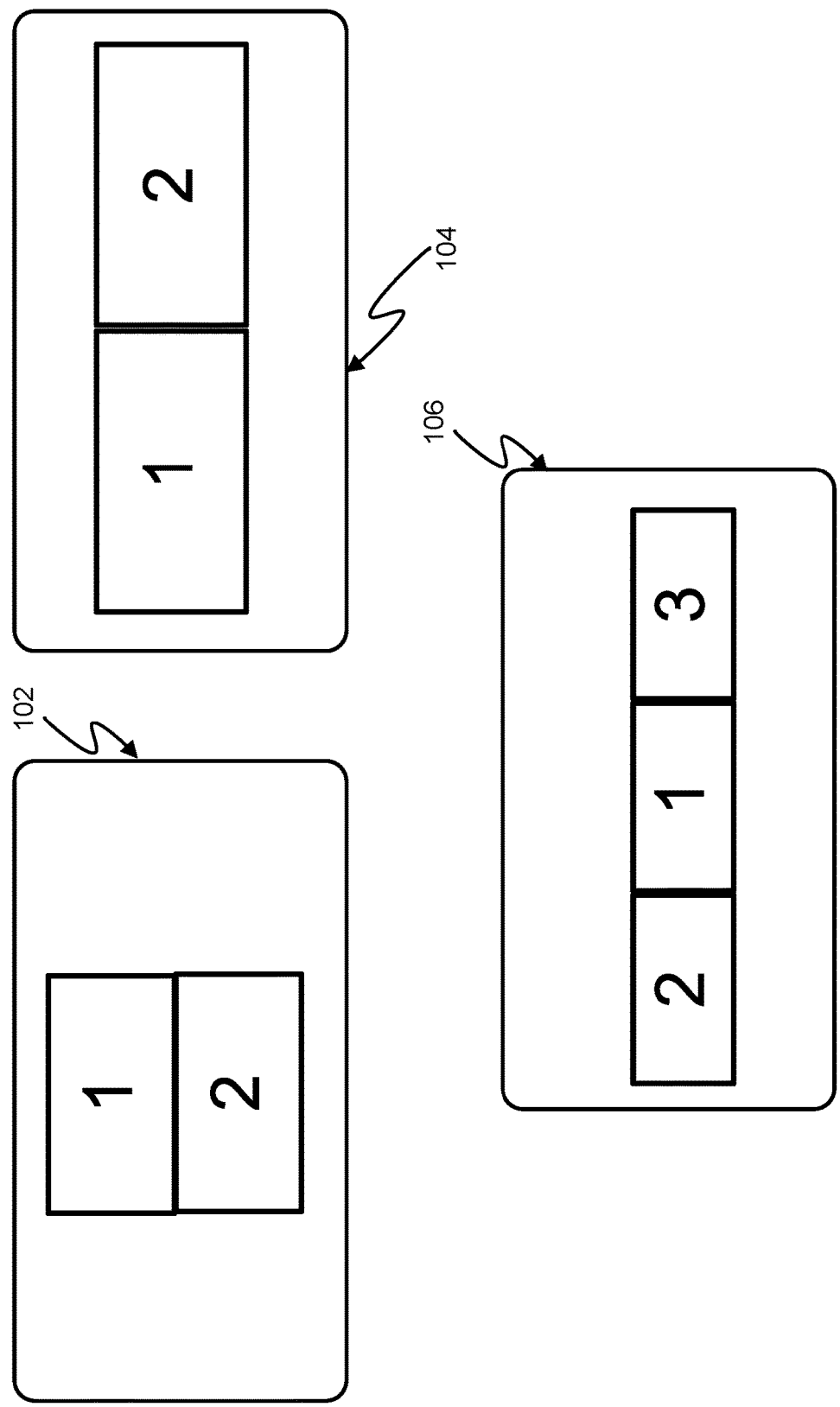
FIG. 1 shows a general illustration of components of an information handling system as implemented in the system and method of the present invention.

FIG. 1 depicts several examples of screenshots of extended desktop monitor configurations. In these examples, screenshot 102 illustrates a vertical desktop configuration of monitors in which the video displayed on Monitor 1 is arranged above the video displayed on Monitor 2. Screenshot 104 depicts a horizontal desktop arrangement in which the video displayed on Monitor 1 is displayed to the left of the video displayed on Monitor 2. Screenshot 106 depicts an extended desktop monitor configuration having three monitors. In the three monitor configuration, the video displayed on Monitor 2 is displayed to the left of the video displayed on Monitor 1. The video displayed on Monitor 3 is displayed to the right of the video displayed on Monitor 1. It will be recognized that various arrangements of extended desktop monitor configurations may also be employed.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a laptop, a mobile device, or any other suitable device and may vary in size, shape, performance, functionality, and price. The IHS may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 2:
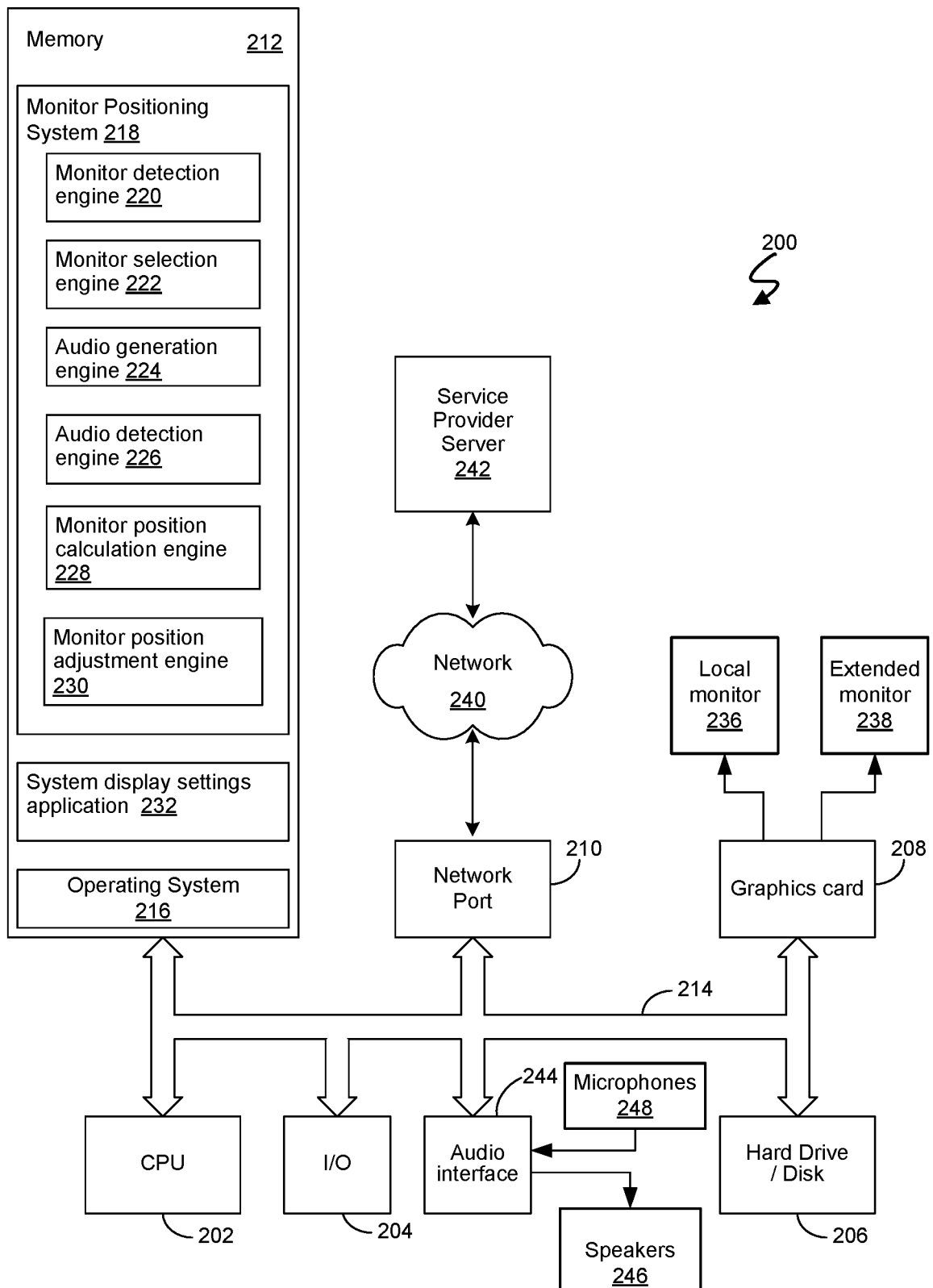
FIG. 2 is a generalized illustration of an information handling system, such as a laptop computer.

FIG. 2 is a generalized illustration of an IHS, such as a laptop computer 200. For purposes of the following discussion, IHS is described as a laptop computer 200 that is configured to automatically detect an extended desktop monitor's position relative to a local monitor (e.g., the display integral to the laptop) in an extended desktop monitor configuration. The laptop computer 200 includes a processor (e.g., central processor unit or "CPU") 202, input/output (I/O) devices 204 (e.g., a keyboard, a mouse, USB ports, serial ports, etc.), and a hard drive or disk storage 206. In various embodiments, the laptop computer 200 also includes network port 210 operable to connect to a network 240, which is likewise accessible by a service provider server 242.

Laptop computer 200 includes a graphics card 208 that is capable of providing video output to multiple displays in an extended desktop monitor configuration. In the example shown in FIG. 2, the graphics card 208 is connected to provide video to two monitors, shown here as local monitor 236 and extended desktop monitor 238. For purposes of the following discussion, local monitor 236 is the monitor that is integral with the laptop computer 200 while extended desktop monitor 238 is an external monitor that is to be configured with the local monitor 236 in an extended desktop monitor configuration. In certain embodiments, the graphics card 208 can provide video output to additional display monitors beyond local monitor 236 and extended desktop monitor 238. Additionally, or in the alternative, extended desktop monitor 238 can be connected to laptop computer 200 through other ports, such as a USB port, USB HDMI adapters, etc.

Laptop computer 200 includes an audio interface 244. In the example shown in FIG. 2, the audio interface 244 is configured to provide audio output to one or more speakers 246 that are integrated with the housing of the extended desktop monitor 238. Additionally, or in the alternative, speakers 246 may be connected through a USB port, a USB sound adapter, etc. Audio interface 244 is also configured to receive audio signals from at least two laptop microphones 248. The laptop microphones 248 may be integral with the laptop and spaced from one another by a known distance. In certain embodiments, the audio interface 244 is also configured to drive speakers of additional extended desktop monitors and receive audio signals from additional laptop microphones.

The laptop computer 200 also includes system memory 212, which is interconnected to the foregoing via one or more buses 214. System memory 212 includes an operating system (OS) 216 and, in various embodiments, a monitor positioning system 218. The embodiment of the monitor positioning system 218 shown in FIG. 2 includes a monitor detection engine 220, a monitor selection engine 222, an audio generation engine 224, an audio detection engine 226, a monitor position calculation engine 228, and a monitor position adjustment engine 230.

In certain embodiments, the monitor detection engine 220 detects when an external monitor, such as extended desktop monitor 238, is connected to the laptop computer 200. Connection of the extended desktop monitor 238 may act as a triggering event that directs the monitor positioning system 218 to initiate operations in which operations relating to positioning the extended desktop monitor 238 with respect to the local monitor 236 are undertaken.

In embodiments in which the monitor positioning system 218 can position multiple extended desktop monitors in the extended desktop configuration settings, the monitor selection engine 222 may select the extended desktop monitor that is to actively undergo one or more positioning operations. For example, the monitor selection engine 222 may instruct other portions of the monitor positioning system 218 to execute positioning operations for a particular extended desktop monitor.

In certain embodiments, the audio generation engine 224 operates to generate an acoustic signal that is to be provided to speakers 246 of the extended desktop monitor 238. Various types of acoustic signals may be used, including a continuous tone (audible or ultrasonic), an acoustic pulse (audible or ultrasonic), a combination of a continuous tone and an acoustic pulse, or other waveform and/or frequency.

In certain embodiments, the audio detection engine 226 receives digital audio from the audio interface 244 that is detected by the laptop microphones 248. The resulting digital audio may be provided to the monitor position calculation engine 228. In certain embodiments, the monitor position calculation engine 228 compares the digital audio received at a first microphone of the laptop microphones 248 with a second microphone of the laptop microphones 248.

In certain embodiments, the comparison is based on the time difference between the time an acoustic pulse is received at the first microphone of laptop microphones 248 with the time the acoustic pulse is received at the second microphone of laptop microphones 248. Such a time difference corresponds to the difference in the position of the laptop microphones 248 of the laptop computer 200 in relation to the speakers 246 of the extended desktop monitor 238 from which the acoustic pulse was emitted. The time difference corresponds to the relative position of the extended desktop monitor 238 with respect to the local monitor 236.

Additionally, on the alternative, the comparison is based on the phase of a continuous tone received at the first microphone of the laptop microphones 248 with the phase of the continuous tone received at the second microphone of laptop microphones 248. Such a phase difference corresponds to the position of the laptop microphones 248 of the laptop computer 200 in relation to the speakers 246 of the extended desktop monitor 238 that emitted the acoustic pulse. The phase difference corresponds to the relative position of the extended desktop monitor 238 with respect to the local monitor 236.

Once the position of the extended desktop monitor 238 is determined relative to the local monitor 236, certain embodiments provide the relative positions to a monitor position adjustment engine 230. In certain embodiments, the monitor position adjustment engine 230 determines the parameters that will be used to adjust the relative positions of the local monitor 236 and extended desktop monitor 238 in the extended desktop display configuration settings of the laptop computer 200. To this end, certain embodiments of the laptop computer 200 include a system display settings application 232. In certain embodiments, the system display settings application 232 is integrated with the monitor positioning system 218. Additionally, or in the alternative, the system display settings application 232 may operate as an independent application associated and/or integrated with the operating system 216.

Figure 3:
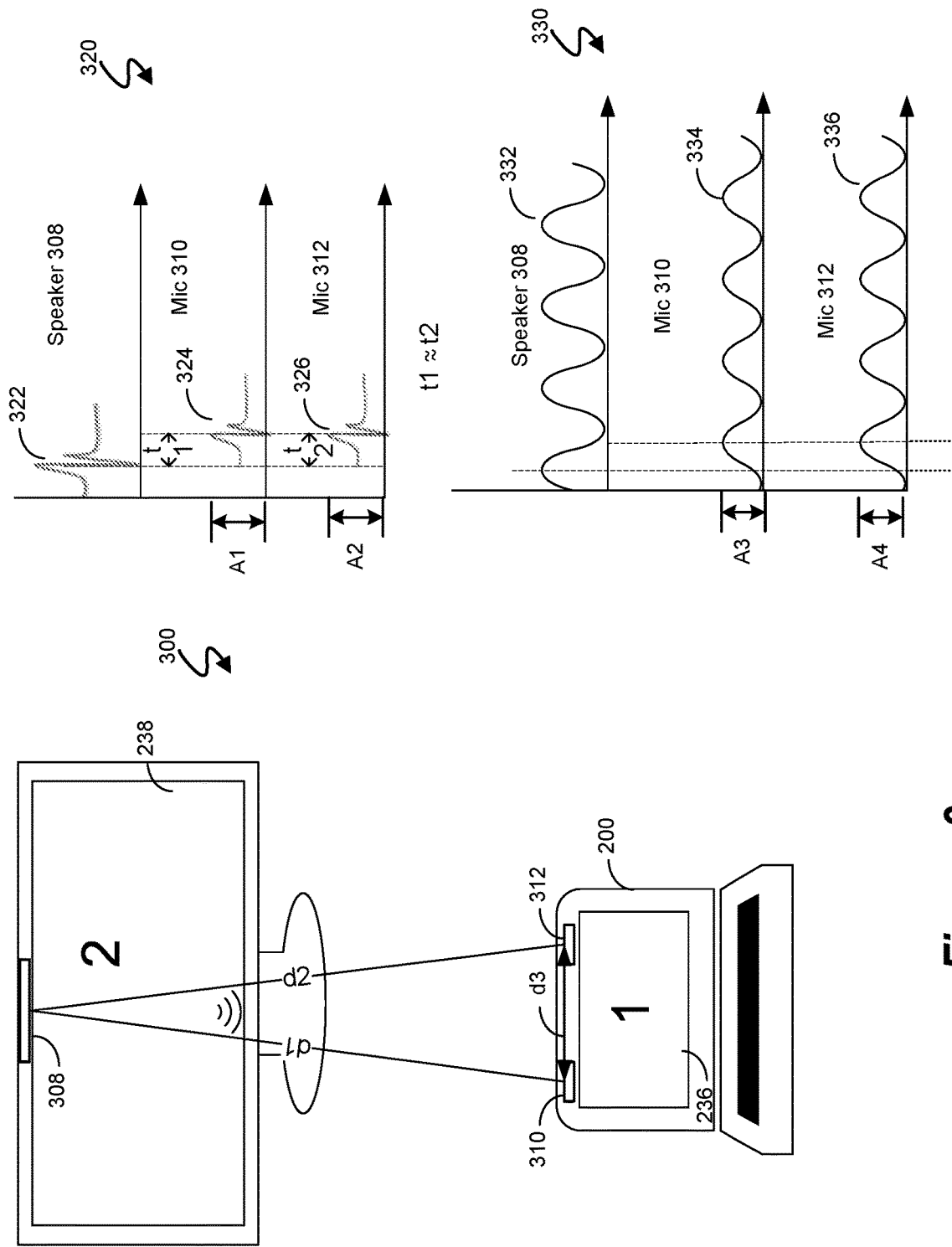
FIG. 3 depicts the physical arrangement and acoustic positioning of monitors in an extended desktop monitor configuration in which a laptop monitor is arranged in a vertical configuration with an external monitor.

FIG. 3 depicts the physical positioning of monitors in an extended desktop monitor configuration 300 in which a local monitor 236, referenced here as Monitor 1, is arranged in a vertical configuration with an extended desktop monitor 238, referenced here as Monitor 2. In certain embodiments, extended desktop monitor 238, shown here as Monitor 2, includes at least one speaker 308 that may be driven by an audio interface of laptop computer 200. In certain embodiments, Monitor 2 may have stereo speakers. However, in the case of stereo speakers, certain embodiments may opt only to use one of the speakers to determine the relative position of Monitor 2 with respect to Monitor 1.

Laptop computer 200 includes at least two microphones 310 and 312. Microphones 310 and 312 are in fixed alignment with Monitor 1 and spaced from one another by a known distance d3. Since distance d3 is known, the difference between the sound characteristics received at microphone 310 and the sound characteristics received at microphone 312 may be used to determine the direction and position of sound emitted by speaker 308 with respect to Monitor 1.

In this exemplary physical arrangement, microphone 310 is at a distance d1 from speaker 308, while microphone 310 is at a distance d2 from speaker 308. In the example shown FIG. 3, the laptop computer 200 is displaced vertically from Monitor 2. Further, Monitor 1 and Monitor 2 are generally aligned along the same vertical axis. As such, d1 is approximately the same as d2.

Timing graph 320 depicts acoustic signals that may be emitted by speaker 308 and detected at microphones 310 and 312. In this example, speaker 308 is driven by an acoustic pulse 322. The acoustic pulse 322 travels a distance d1 before being detected at microphone 310 as acoustic pulse 324. The time taken by the acoustic pulse 322 to reach microphone 310 is t1. Similarly, the acoustic pulse 322 travels a distance d2 before being detected at microphone 312 as acoustic pulse 326. The time taken by the acoustic pulse 322 to reach microphone 312 is t2. Since t1 is approximately equal to t2, the monitor positioning system 218 of laptop computer 100 determines that Monitor 2 is vertically spaced from and vertically aligned with Monitor 1. Further, the amplitude A1 of acoustic pulse 324 is substantially equal to the amplitude A2 of acoustic pulse 326 since both acoustic pulses are attenuated over the same distance d1=d2. The amplitude information may also be used to determine the relative position of Monitor 2 with respect to Monitor 1.

Timing graph 330 depicts acoustic signals that may be emitted by speaker 308 and detected at microphones 310 and 312 when the speaker 308 is driven by a continuous tone 332. In certain embodiments, the continuous tone 332 is an audible tone within the hearing range of a human. In other embodiments, the continuous tone 332 is an ultrasonic tone that is outside the hearing range of a human.

The continuous tone 332 is received at microphone 310 as continuous tone 334 and has a phase difference y1 with respect to the phase of continuous tone 332 as a result of having traversed a distance d1. Similarly, the continuous tone 332 is received at microphone 312 as continuous tone 336 with a phase difference of y1 with respect to continuous tone 332 as a result of having traversed distance d2. Since d1=d2 in this example, the phase difference y1 of continuous tones 334 and 336 are the same with respect to continuous tone 332. Based on this general equality, the monitor positioning system 218 of laptop computer 100 determines that Monitor 2 is vertically spaced from and vertically aligned with Monitor 1. Further, the amplitude A3 of continuous tone 334 is substantially equal to the amplitude A4 of continuous tone 336 since both acoustic pulses are attenuated over the same distance d1=d2. This amplitude difference may also be used to determine the relative position of Monitor 2 with Monitor 1.

Figure 4:
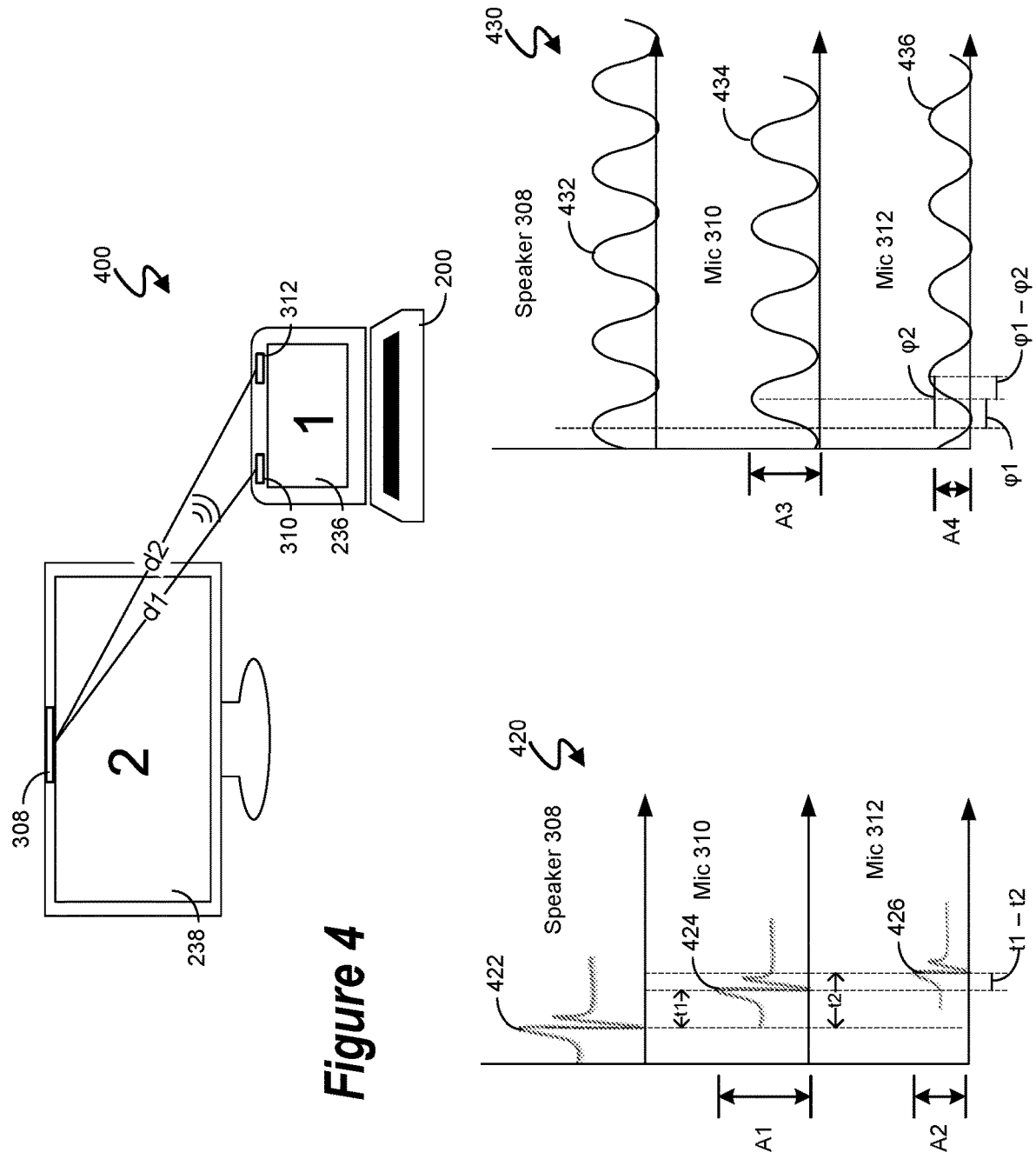
FIG. 4 depicts another physical arrangement and acoustic positioning of extended desktop monitors where the extended desktop monitor is placed to the upper left of a laptop monitor.

FIG. 4 depicts another physical arrangement of extended desktop monitors 400, where the extended desktop monitor 238, referenced here as Monitor 2, is placed to the upper left of local monitor 236, reference here as Monitor 1. In this example, speaker 308 is at a distance d1 with respect to microphone 310, and at a distance d2 with respect to microphone 310, where d2>d1.

Timing graph 420 depicts acoustic signals that may be emitted by speaker 308 and detected at microphones 310 and 312. In this example, speaker 308 is driven by an acoustic pulse 422. The acoustic pulse 422 travels a distance d1 before being detected at microphone 310 as acoustic pulse 424. The time taken by the acoustic pulse 422 to reach microphone 310 is t1. Similarly, the acoustic pulse 422 travels a distance d2 before being detected at microphone 312 as acoustic pulse 426. The time taken by the acoustic pulse 422 to reach microphone 312 is t2. Since t1 is less than t2, the monitor positioning system 218 of laptop computer 200 determines that Monitor 2 is horizontally spaced from Monitor 1. In certain embodiments, the value of t1−t2 must be negative and have a magnitude greater than a predetermined threshold before the monitor positioning system 218 makes a determination that Monitor 2 should be placed to the left of Monitor 1 in the extended desktop monitor configuration settings of the laptop computer 200. Further, the amplitude A1 of acoustic pulse 424 is greater than the amplitude A2 of acoustic pulse 426 since the acoustic pulses are attenuated over different distances d1<d2. The amplitude information may also be used to determine the relative position of Monitor 2 with respect to Monitor 1.

Timing graph 430 depicts acoustic signals that may be emitted by speaker 308 and detected at microphones 310 and 312 when the speaker 308 is driven by a continuous tone 432. In certain embodiments, the continuous tone 432 is an audible tone within the hearing range of a human. In other embodiments, the continuous tone 432 is an ultrasonic tone that is outside the hearing range of a human.

The continuous tone 432 is received at microphone 310 as continuous tone 434 and has a phase difference $\varphi 1$ with respect to the phase of continuous tone 432 as a result of having traversed a distance d1. Similarly, the continuous tone 432 is received at microphone 312 as continuous tone 436 with a phase difference of $\varphi 2$ with respect to continuous tone 432 as a result of having traversed distance d2. Since d1<d2 in this example, the phase difference $\varphi 1$ of continuous tone 434 is less than the phase difference $\varphi 2$ of continuous tone 436 with respect to continuous tone 432. Based on this difference, the monitor positioning system 218 of laptop computer 200 determines that Monitor 2 is horizontally positioned to the left of Monitor 1. In certain embodiments, the value of $\varphi 1-\varphi 2$ must be negative and have a magnitude greater than a predetermined threshold before the monitor positioning system 218 makes a determination that Monitor 2 should be placed horizontally to the left of Monitor 1 in the extended desktop monitor configuration settings of the laptop computer 200. Further, the amplitude A of continuous tone 434 is greater than the amplitude A4 of continuous tone 436 since the acoustic pulses are attenuated over different distances where d1<d2. This amplitude difference may also be used to determine the relative position of Monitor 2 with respect to Monitor 1.

Figure 5:
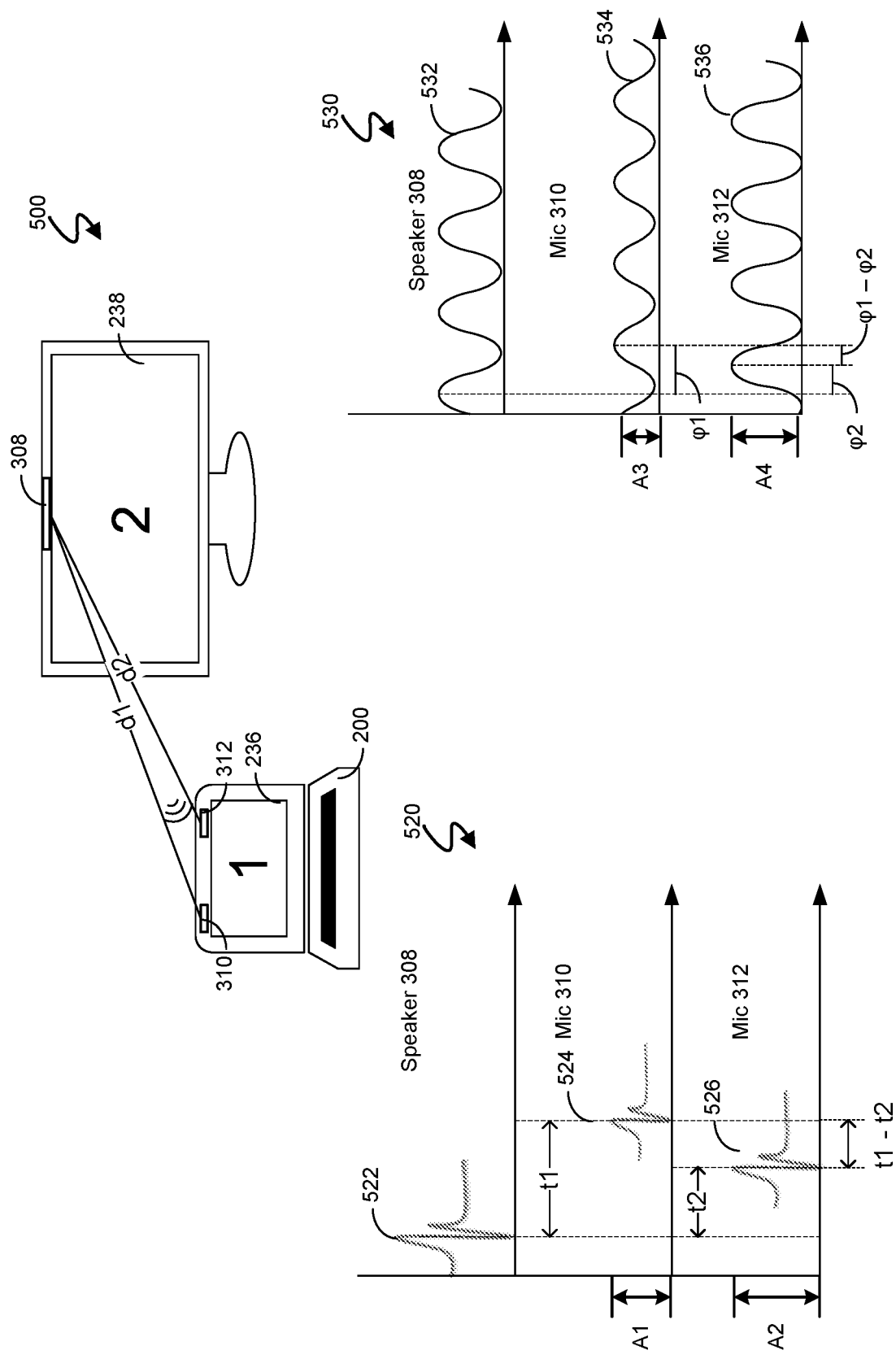
FIG. 5 depicts another physical arrangement and acoustic positioning of extended desktop monitors, where the extended desktop monitor is placed at the upper left of a laptop monitor.

FIG. 5 depicts another physical arrangement of extended desktop monitors 500, where the extended desktop monitor 238, referenced here as Monitor 2, is placed to the upper right of local monitor 236, reference here as Monitor 1. In this example, speaker 308 is at a distance d1 with respect to microphone 310, and at a distance d2 with respect to microphone 310, where d1>d2.

Timing graph 520 depicts acoustic signals that may be emitted by speaker 308 and detected at microphones 310 and 312. In this example, speaker 308 is driven by an acoustic pulse 522. The acoustic pulse 422 travels a distance d1 before being detected at microphone 310 as acoustic pulse 424. The time taken by the acoustic pulse 422 to reach microphone 310 is t1. Similarly, the acoustic pulse 422 travels a distance d2 before being detected at microphone 312 as acoustic pulse 426. The time taken by the acoustic pulse 522 to reach microphone 312 is t2. Since t1 is greater than t2, the monitor positioning system 218 of laptop computer 200 determines that Monitor 2 is horizontally spaced to the right of Monitor 1. In certain embodiments, the value of t1−t2 must be positive and have a magnitude greater than a predetermined threshold before the monitor positioning system 218 makes a determination that Monitor 2 should be placed to the right of Monitor 1 in the extended desktop monitor configuration settings of the laptop computer 200. Further, the amplitude A1 of acoustic pulse 524 is greater than the amplitude A2 of acoustic pulse 426 since the acoustic pulses are attenuated over different distances, where d1<d2. The amplitude information may also be used to determine the relative position of Monitor 2 with respect to Monitor 1.

Timing graph 530 depicts acoustic signals that may be emitted by speaker 308 and detected at microphones 310 and 312 when the speaker 308 is driven by a continuous tone 532. In certain embodiments, the continuous tone 532 is an audible tone within the hearing range of a human. In other embodiments, the continuous tone 532 is an ultrasonic tone that is outside the hearing range of a human.

The continuous tone 532 is received at microphone 310 as continuous tone 534 and has a phase difference y1 with respect to the phase of continuous tone 532 as a result of having traversed a distance d1. Similarly, the continuous tone 532 is received at microphone 312 as continuous tone 436 with a phase difference of $\varphi 2$ with respect to continuous tone 532 as a result of having traversed distance d2. Since d1>d2 in this example, the phase difference y1 of continuous tone 534 is greater than the phase difference $\varphi 2$ of continuous tone 536 with respect to continuous tone 532. Based on this difference, the monitor positioning system 218 of laptop computer 200 determines that Monitor 2 is horizontally placed to the left of Monitor 1. In certain embodiments, the value of y1−$\varphi 2$ must be positive and have a magnitude greater than a predetermined threshold before the monitor positioning system 218 makes a determination that Monitor 2 should be placed horizontally to the left of Monitor 1 in the extended desktop monitor configuration settings of the laptop computer 200. Further, the amplitude A3 of continuous tone 534 is less than the amplitude A4 of continuous tone 536 since the acoustic pulses are attenuated over different distances where d1<d2. This amplitude difference may also be used to determine the relative position of Monitor 2 with respect to Monitor 1.

Figure 6:
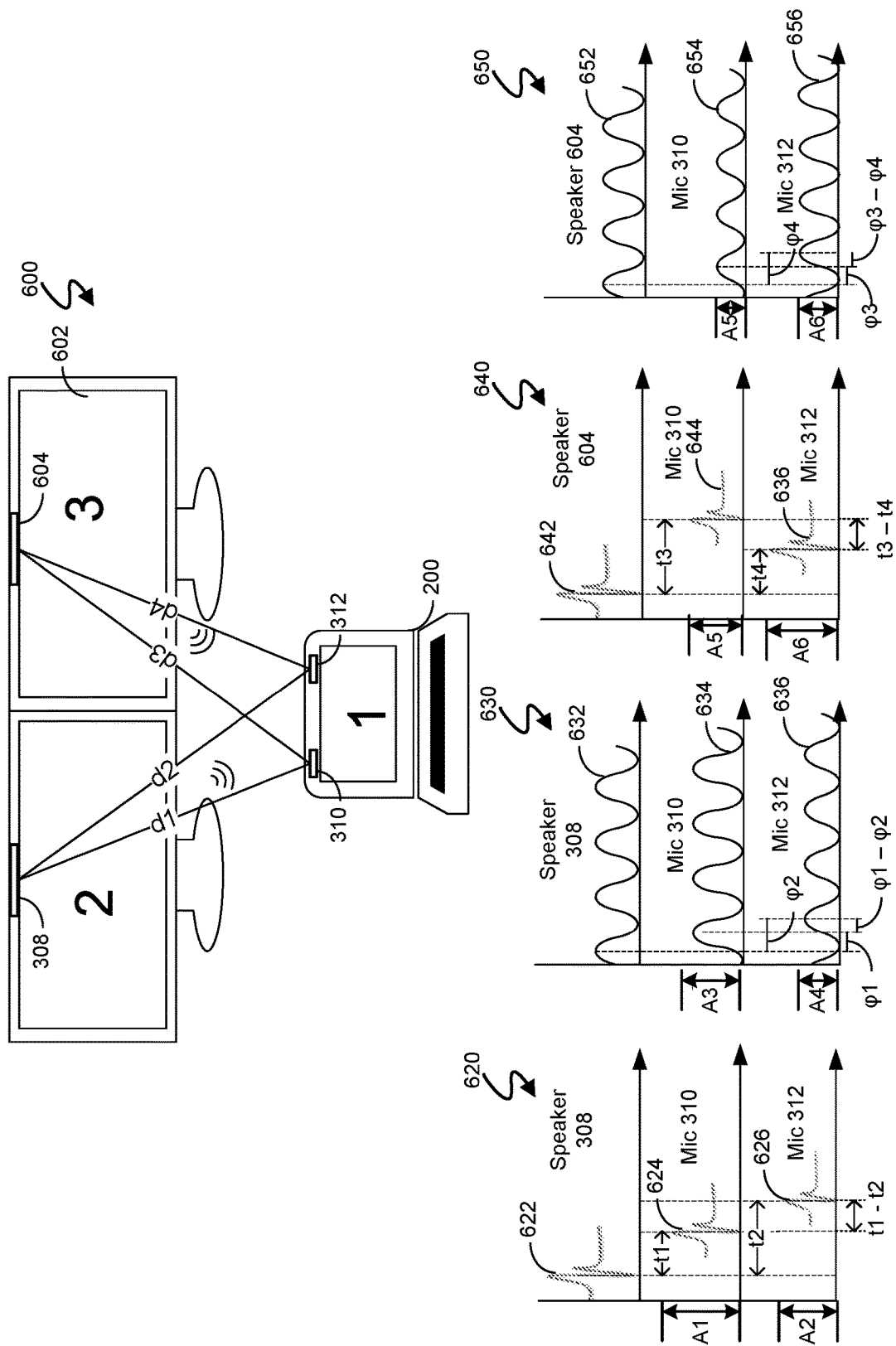
FIG. 6 depicts another physical arrangement and corresponding acoustic positioning of extended desktop monitors, where an extended monitor is placed at the upper left of a laptop monitor, and a further extended monitor is placed at the upper right of the laptop monitor.

FIG. 6 depicts another physical arrangement of extended desktop monitors 600, where extended desktop monitor 238, referenced here as Monitor 2, is placed to the upper left of local monitor 236, referenced here as Monitor 1. In this example, speaker 308 is at a distance d1 with respect to microphone 310, and at a distance d2 with respect to microphone 310, where d2>d1.

The physical arrangement of the extended desktop monitors 600 also includes a further extended desktop monitor 602, referenced here as Monitor 3, having a speaker 604. Monitor 3 is located above and slightly to the right of Monitor 1. In this example, microphone 310 is at a distance d3 from speaker 604, while microphone 310 is at a distance d4 from microphone 312, where d3>d4.

Timing graph 620 depicts acoustic signals that may be emitted by speaker 308 and detected at microphones 310 and 312. In this example, speaker 308 is driven by an acoustic pulse 622. The acoustic pulse 622 travels a distance d1 before being detected at microphone 310 as acoustic pulse 624. The time taken by the acoustic pulse 622 to reach microphone 310 is t1. Similarly, the acoustic pulse 622 travels a distance d2 before being detected at microphone 312 as acoustic pulse 626. The time taken by the acoustic pulse 622 to reach microphone 312 is t2. Since t1 is less than t2, the monitor positioning system 218 of laptop computer 200 determines that Monitor 2 is horizontally spaced to the left of Monitor 1. In certain embodiments, the value of t1−t2 must be negative and have a magnitude greater than a predetermined threshold before the monitor positioning system 218 makes a determination that Monitor 2 should be placed to the left of Monitor 1 in the extended desktop monitor configuration settings of the laptop computer 200. Further, the amplitude A1 of acoustic pulse 624 is greater than the amplitude A2 of acoustic pulse 626 since the acoustic pulses are attenuated over different distances d1<d2. The amplitude information may also be used to determine the relative position of Monitor 2 with respect to Monitor 1.

Timing graph 630 depicts acoustic signals that may be emitted by speaker 604 and detected at microphones 310 and 312 when the speaker 308 is driven by a continuous tone 632. In certain embodiments, the continuous tone 632 is an audible tone within the hearing range of a human. In other embodiments, the continuous tone 632 is an ultrasonic tone that is outside the hearing range of a human.

The continuous tone 632 is received at microphone 310 as continuous tone 634 and has a phase difference $\varphi 1$ with respect to the phase of continuous tone 632 as a result of having traversed a distance d1. Similarly, the continuous tone 632 is received at microphone 312 as continuous tone 636 with a phase difference of $\varphi 2$ with respect to continuous tone 632 as a result of having traversed distance d2. Since d1<d2 in this example, the phase difference $\varphi 1$ of continuous tone 634 is less than the phase difference $\varphi 2$ of continuous tone 636 with respect to continuous tone 632. Based on this difference, the monitor positioning system 218 of laptop computer 200 determines that Monitor 2 is horizontally placed to the left of Monitor 1. In certain embodiments, the value of $\varphi 1-\varphi 2$ must be negative and have a magnitude greater than a predetermined threshold before the monitor positioning system 218 makes a determination that Monitor 2 should be placed horizontally to the left of Monitor 1 in the extended desktop monitor configuration settings of the laptop computer 200. Further, the amplitude A3 of continuous tone 634 is greater than the amplitude A4 of continuous tone 636 since the acoustic pulses are attenuated over different distances where d1<d2. This amplitude difference may also be used to determine the relative position of Monitor 2 with respect to Monitor 1.

Timing graph 640 depicts acoustic signals that may be emitted by speaker 604 and detected at microphones 310 and 312. In this example, speaker 604 is driven by an acoustic pulse 642. The acoustic pulse 622 travels a distance d3 before being detected at microphone 310 as acoustic pulse 624. The time taken by the acoustic pulse 622 to reach microphone 310 is t3. Similarly, the acoustic pulse 622 travels a distance d4 before being detected at microphone 312 as acoustic pulse 626. The time taken by the acoustic pulse 622 to reach microphone 312 is t4. Since t3 is greater than t4, the monitor positioning system 218 of laptop computer 200 determines that Monitor 2 is horizontally spaced to the right of Monitor 1. In certain embodiments, the value of t1-t2 must be positive and have a magnitude greater than a predetermined threshold before the monitor positioning system 218 makes a determination that Monitor 3 should be placed to the right of Monitor 1 in the extended desktop monitor configuration settings of the laptop computer 200. Further, the amplitude A5 of acoustic pulse 624 is greater than the amplitude A6 of acoustic pulse 626 since the acoustic pulses are attenuated over different distances, where d3<d4. The amplitude information may also be used to determine the relative position of Monitor 3 with respect to Monitor 1.

Timing graph 650 depicts acoustic signals that may be emitted by speaker 604 and detected at microphones 310 and 312 when the speaker 604 is driven by a continuous tone 652. In certain embodiments, the continuous tone 652 is an audible tone within the hearing range of a human. In other embodiments, the continuous tone 652 is an ultrasonic tone that is outside the hearing range of a human.

The continuous tone 652 is received at microphone 310 as continuous tone 654 and has a phase difference $\varphi 3$ with respect to the phase of continuous tone 652 as a result of having traversed a distance d3. Similarly, the continuous tone 652 is received at microphone 312 as continuous tone 656 with a phase difference of $\varphi 4$ with respect to continuous tone 652 as a result of having traversed distance d4. Since d3>d4 in this example, the phase difference $\varphi 3$ of continuous tone 654 is less than the phase difference $\varphi 4$ of continuous tone 656 with respect to continuous tone 652. Based on this difference, the monitor positioning system 218 of laptop computer 200 determines that Monitor 3 is horizontally placed to the right of Monitor 1. In certain embodiments, the value of $\varphi 3-\varphi 4$ must be negative and have a magnitude greater than a predetermined threshold before the monitor positioning system 218 makes a determination that Monitor 3 should be placed horizontally to the right of Monitor 1 in the extended desktop monitor configuration settings of the laptop computer 200. Further, the amplitude A5 of continuous tone 654 is less than the amplitude A6 of continuous tone 656 since the acoustic pulses are attenuated over different distances where d3<d4. This amplitude difference may also be used to determine the relative position of Monitor 3 with respect to Monitor 1.

Figure 7:
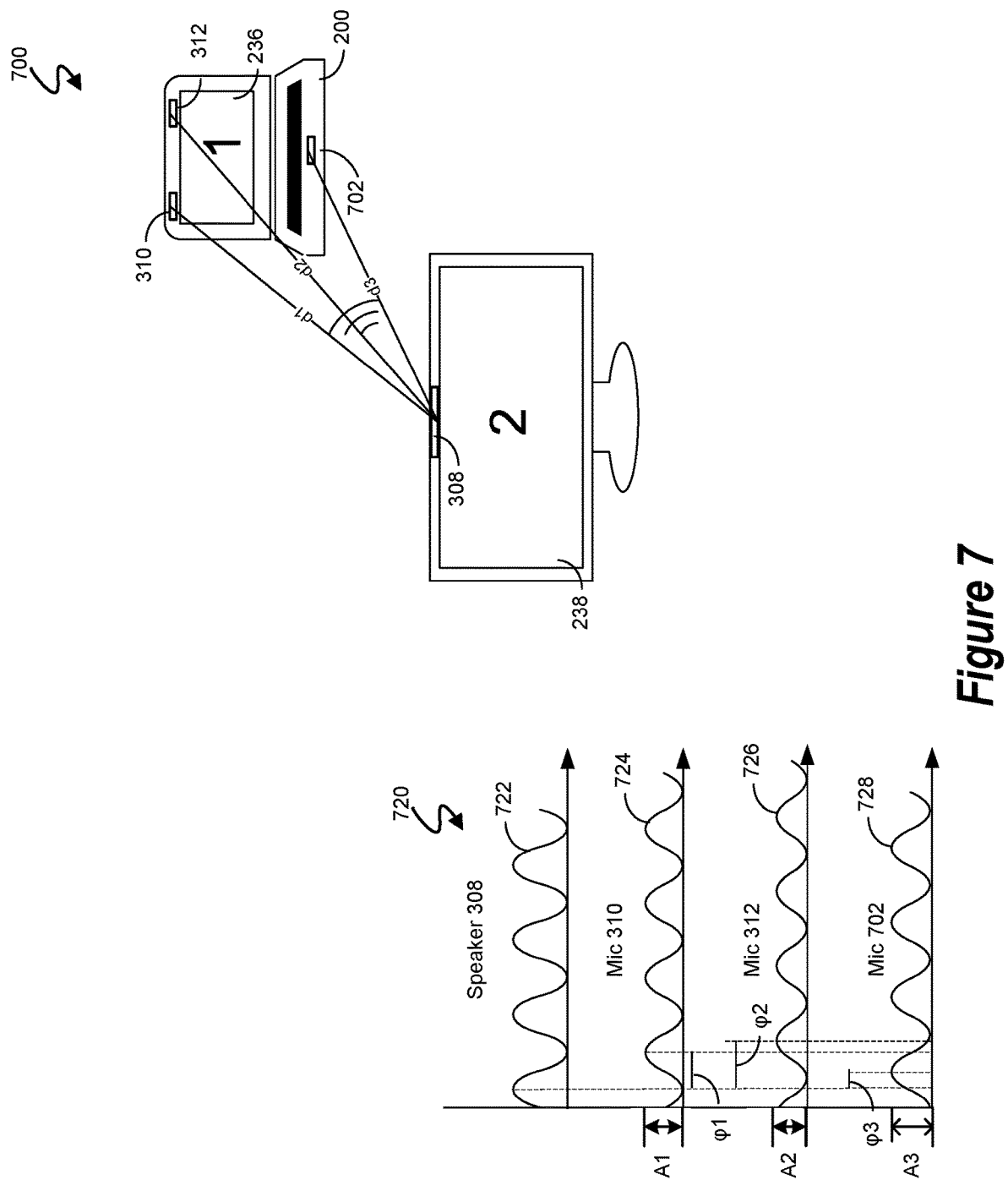
FIG. 7 depicts a physical arrangement and corresponding acoustic positioning of an extended desktop monitor, where the laptop computer uses an additional microphone in the positioning operations.

FIG. 7 depicts a physical arrangement of extended desktop monitors 700. In this configuration, however, laptop computer 200 includes an additional microphone 702. In certain embodiments, the addition of microphone 702 can be employed to determine the vertical position of Monitor 2 with respect to Monitor 1.

Timing graph 720 depicts acoustic signals that may be emitted by speaker 308 and detected at microphones 310, 312, and 702 when the speaker 308 is driven by a continuous tone 722. In certain embodiments, the continuous tone 722 is an audible tone within the hearing range of a human. In other embodiments, the continuous tone 722 is an ultrasonic tone that is outside the hearing range of a human.

The continuous tone 722 is received at microphone 310 as continuous tone 724 and has a phase difference y1 with respect to the phase of continuous tone 722 as a result of having traversed a distance d1. Similarly, the continuous tone 722 is received at microphone 312 as continuous tone 726 with a phase difference of $\varphi 2$ with respect to continuous tone 722 as a result of having traversed distance d2. Since d1<d2 in this example, the phase difference y1 of continuous tone 724 is less than the phase difference $\varphi 2$ of continuous tone 726 with respect to continuous tone 722. Based on this difference, the monitor positioning system 218 of laptop computer 200 determines that Monitor 2 is positioned horizontally to the right of Monitor 1. In certain embodiments, the value of y1-$\varphi 2$ must be negative and have a magnitude greater than a predetermined threshold before the monitor positioning system 218 makes a determination that Monitor 2 should be placed horizontally to the left of Monitor 1 in the extended desktop monitor configuration of the laptop computer 200. Further, the amplitude A1 of continuous tone 724 is greater than the amplitude A2 of continuous tone 726 since the acoustic tone is high attenuated over different distances where d1<d2. This amplitude difference may also be used to determine the relative position of Monitor 2 with respect to Monitor 1.

Continuous tone 722 is received at microphone 702 as continuous tone 728 and has a phase difference of $\varphi 3$ with respect to continuous tone 722 as a result of having traveled distance d3. Since d1>d3 in this example, the phase difference φ3 of continuous tone 724 is less than the phase difference φ1 of continuous tone 726 with respect to continuous tone 822. Based on this difference, the monitor positioning system 218 of laptop computer 200 determines that Monitor 2 is positioned horizontally below the horizontal level of Monitor 1. In certain embodiments, the value of y1 −φ3 must be negative and have a magnitude proximate to a predetermined threshold before the monitor positioning system 218 makes a determination that Monitor 2 should be placed vertically below Monitor 1 in the extended desktop monitor configuration of the laptop computer 200. Further, the amplitude A1 of continuous tone 724 is less than the amplitude A3 of continuous tone 828 since the acoustic tone is attenuated over different distances where d3>d1. This amplitude difference may also be used to determine the relative vertical position of Monitor 2 with respect to Monitor 1.

FIG. 8 depicts a physical arrangement of extended desktop monitors 800. In this configuration, laptop computer 200 again includes the additional microphone 702. As previously noted, the addition of microphone 702 can be employed to determine the vertical position of Monitor 2 with respect to Monitor 1.

Timing graph 820 depicts acoustic signals that may be emitted by speaker 308 and detected at microphones 310, 312, and 702 when the speaker 308 is driven by a continuous tone 822. In certain embodiments, the continuous tone 822 is an audible tone within the hearing range of a human. In other embodiments, the continuous tone 822 is an ultrasonic tone that is outside the hearing range of a human.

The continuous tone 822 is received at microphone 310 as continuous tone 824 and has a phase difference y1 with respect to the phase of continuous tone 822 as a result of having traversed a distance d1. Similarly, the continuous tone 822 is received at microphone 312 as continuous tone 826 with a phase difference of φ2 with respect to continuous tone 822 as a result of having traversed distance d2. Since d1<d2 in this example, the phase difference y1 of continuous tone 824 is less than the phase difference φ2 of continuous tone 826 with respect to continuous tone 822. Based on this difference, the monitor positioning system 218 of laptop computer 200 determines that Monitor 2 is positioned horizontally to the left of Monitor 1. In certain embodiments, the value of y1−φ2 must be negative and have a magnitude greater than a predetermined threshold before the monitor positioning system 218 makes a determination that Monitor 2 should be placed horizontally to the left of Monitor 1 in the extended desktop monitor configuration. Further, the amplitude A1 of continuous tone 824 is greater than the amplitude A2 of continuous tone 826 since the continuous tone is attenuated over different distances where d1<d2. This amplitude difference may also be used to determine the relative position of Monitor 2 with respect to Monitor 1.

Continuous tone 822 is received at microphone 702 as continuous tone 828 and has a phase difference of φ3 with respect to continuous tone 822 as a result of having traveled distance d3. Since d3>d1 in this example, the phase difference φ3 of continuous tone 824 is greater than the phase difference y1 of continuous tone 826 with respect to continuous tone 822. Based on this difference, the monitor positioning system 218 of laptop computer 200 determines that Monitor 2 is positioned vertically adjacent to Monitor 1. In certain embodiments, the value of y1 −φ3 must be negative and have a magnitude proximate to a predetermined threshold before the monitor positioning system 218 makes a determination that Monitor 2 should be placed vertically below Monitor 1 in the extended desktop monitor configuration of the laptop computer 200. Further, the amplitude A1 of continuous tone 824 is less than the amplitude A3 of continuous tone 828 since the acoustic tone is attenuated over different distances where d3<d1. This amplitude difference may also be used to determine the relative position of Monitor 2 with respect to Monitor 1.

Figure 9:
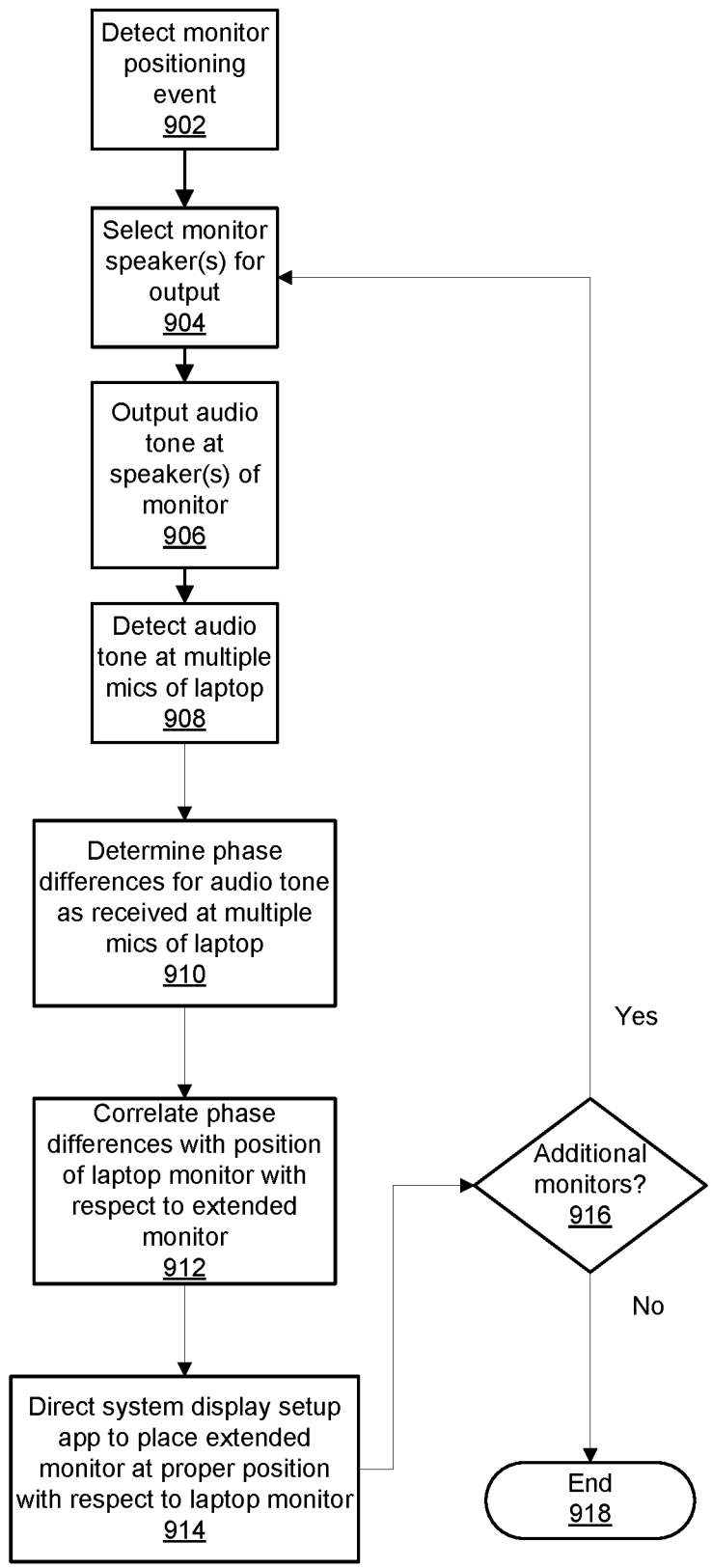
FIG. 9 is a flowchart depicting operations that may be executed in certain embodiments of the disclosed system when the audio waveform is a continuous tone.

FIG. 9 is a flowchart depicting operations that may be executed in certain embodiments of the disclosed system. As shown in FIG. 9, an event indicating that automated monitor positioning is to take place is detected at 902. The presence of an extended desktop monitor having a speaker is detected and selected for positioning operations at 904. At 906, the laptop computer drives the speaker of the extended desktop monitor to output audio. In certain embodiments, the audio is a continuous tone that is within the hearing range of a human. In other examples, the audio is a continuous ultrasonic tone having a frequency that is outside the hearing range of a human.

The continuous tone may be detected at multiple microphones of the laptop at 908. An analysis of the phase relationship between the continuous tone as received at the multiple microphones takes place at operations 910. The phase relationship between the continuous tone as received at the multiple microphones may be analyzed in the frequency domain using conventional frequency/phase relationship algorithms and/or in the time domain using conventional phase detection techniques. For example, the analysis of the phase differences in the frequency domain may include a fast Fourier transform (FFT) analysis, a discrete Fourier transform (DFT) analysis, or the like.

In certain embodiments, the phase differences between the continuous tones received at the microphones are correlated at 912 with corresponding parameters indicating the position of the extended monitor with respect to the laptop monitor. At 914, the system display set up application of the laptop is directed to place the extended monitor at the correlated position with respect to the laptop monitor. A determination may be made at operation 916 as to whether additional extended monitors are to be positioned with respect to the laptop in an extended desktop configuration. If further monitors are to be positioned, the speakers of the further monitor are selected for output at 904, and subsequent operations are undertaken to correlate and set the position of the further monitor at the proper position in the extended desktop configuration. The operations may be repeated until all of the detected monitors have been positioned in the extended desktop configuration. Once all of the detected monitors have been positioned, positioning operations may end at 918 until another monitor positioning event is detected.

Figure 10:
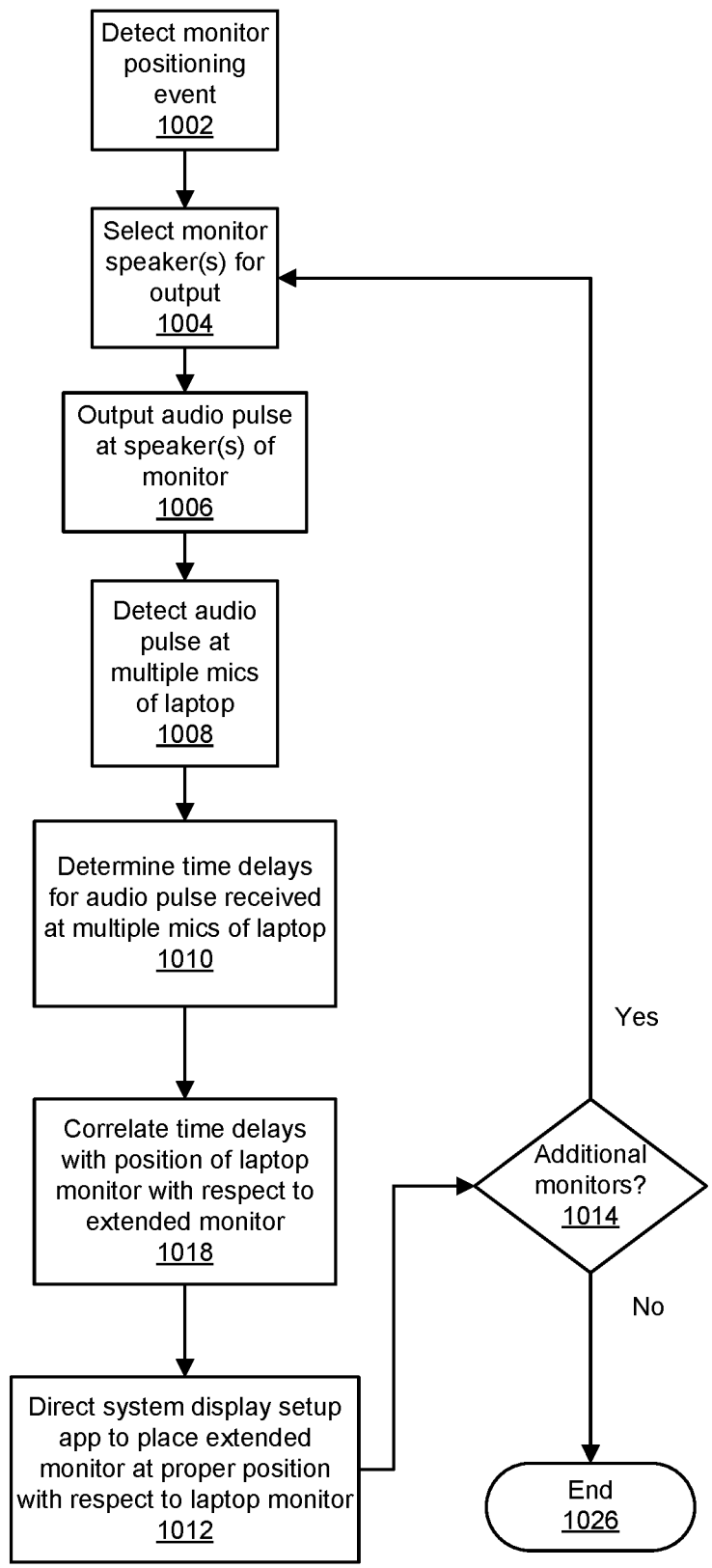
FIG. 10 is a flowchart depicting operations that may be executed in certain embodiments of the disclosed system when the audio waveform is an audio pulse.

FIG. 10 is a flowchart depicting operations that may be executed in certain embodiments of the disclosed system. As shown in FIG. 10, an event indicating that automated monitor positioning is to take place is detected at 1002. The presence of an extended desktop monitor having a speaker is detected and selected for positioning operations at 1004. At 1006, the laptop computer drives the speaker of the extended desktop monitor to output audio. In certain embodiments, the audio signal is an audio pulse that is within the hearing range of a human. In other examples, the audio signal is an ultrasonic pulse having a frequency that is outside the hearing range of a human.

The audio pulse may be detected at multiple microphones of the laptop at 1008. An analysis of the time delay relationship between the audio pulse as received at the multiple microphones takes place at operation 1010. The time delay relationship between the audio pulse as received at the multiple microphones may be analyzed in the frequency domain using conventional frequency/phase relationship algorithms and/or in the time domain using conventional phase detection techniques. For example, the analysis of the phase differences in the frequency domain may include, for example, a fast Fourier transform (FFT) analysis, a discrete Fourier transform (DFT) analysis, or the like.

In certain embodiments, the time delay differences between the audio pulses received at the microphones are correlated at 1012 with corresponding parameters indicating the position of the extended monitor with respect to the laptop monitor. At 1014, the system display set up application of the laptop is directed to place the extended monitor at the correlated position with respect to the laptop monitor. A determination may be made at operation 1016 as to whether additional extended monitors are to be positioned with respect to the laptop in the extended desktop configuration. If further monitors are to be positioned, the speakers of the further monitor are selected for output at 1004, and subsequent operations are undertaken to correlate and set the position of the further monitor at the proper position in the extended desktop configuration. The operations may be repeated until all of the detected monitors have been positioned in the extended desktop configuration. Once all of the detected monitors have been positioned, positioning operations may end at 1018 until such time as another monitor positioning event is detected.

The operations shown in the flowcharts of FIGS. 9 and 10 may be set in a coarse manner (e.g., a binary manner in which the extended monitor is above/below and left/right of the laptop monitor). In such coarse operations, only the relative relationships between the signals received at the microphones are analyzed (e.g., is the phase of the audio signal detected at a first microphone greater than the phase of the audio signal detected at a second microphone). Additionally, or in the alternative, the analysis may include calculations involving specific relationships between the audio signals received at the multiple microphones. For example, specific values for the degrees of the phase relationships between continuous tones as received at the microphones of the laptop computer may be used in formulaic calculations that determine the precise position of an extended desktop monitor with respect to the laptop monitor. As another example, specific time delay values between audio pulses as received at the microphones of the laptop computer may be used in formulaic calculations that determine the precise position of the extended desktop monitor with respect to the laptop monitor. In each instance, the precise formulaic positioning may be used to create extended desktop monitor configurations that accurately represent the position of the monitors in the physical realm.

Waveforms that may be used in the positioning determination include the continuous tones and pulses described herein, but may also include other waveforms. As an example, multiple types of waveforms may be used in sequence in the positioning determinations. As a further example, a first waveform may be used in determining the position of a first extended desktop monitor with respect to the laptop monitor, while a second waveform may be used in determining the position of a second extended desktop monitor with respect to the laptop monitor. Continuous tones of different frequencies as well as audio pulses of different lengths and periods may also be used alone or in combination in the positioning determinations. In certain embodiments, different audio signals may be concurrently emitted from speakers of multiple extended monitors and analyzed using an analysis technique capable of separating the signals received at the multiple microphones based on the monitor from which the signal was emitted.

As will be appreciated by one skilled in the art, the teachings of the disclosure may be embodied as a method, system, or computer program product. Accordingly, embodiments of the disclosure may be implemented in hardware, in software (including firmware, resident software, microcode, etc.), or in an embodiment combining software and hardware. Furthermore, the present disclosure may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method comprising:
    detecting an event indicating that a position of at least one monitor relative to a position of at least one other monitor is to be determined, wherein
        the at least one monitor includes at least one speaker, and
        the at least one other monitor is configured in an information handling system having at least two microphones proximate the at least one other monitor;
    driving the at least one speaker with an acoustic signal;
    receiving the acoustic signal at the at least two microphones;
    analyzing the acoustic signal received at each of the plurality of microphones from the at least one speaker;
    determining, based on the analysis, a relative position of the at least one monitor relative to the at least one other monitor; and
    adjusting extended desktop monitor configuration settings of the information handling system to position the at least one monitor and the at least one other monitor in the relative position.

2. The computer-implemented method of claim 1, wherein
    the acoustic signal is at least one of a continuous tone or an acoustic pulse.

3. The computer-implemented method of claim 2, wherein
    the continuous tone is an ultrasonic tone.

4. The computer-implemented method of claim 1, wherein
    the analysis of the acoustic signal received at each of the at least two microphones includes at least one of:
        detecting a time at which an acoustic pulse signal is received at a first microphone of the at least two microphones with a time at which the acoustic pulse signal is received at a second microphone of the at least two microphones; and
        detecting a phase of a continuous tone received at a first microphone of the at least two microphones with a phase of the continuous tone received at a second microphone of the at least two microphones.

5. The computer-implemented method of claim 4, wherein
    the determining includes at least one of:
        determining the relative position of the at least one monitor relative to the at least one other monitor by comparing the time at which the acoustic pulse signal is received at the first microphone of the at least two microphones with the time at which the acoustic pulse signal is received at the second microphone of the at least two microphones; and
        determining the relative position of the at least one monitor relative to the at least one other monitor by comparing the phase of the continuous tone received at the first microphone of the at least two microphones with the phase of the continuous tone received at the second microphone of the at least two microphones.

6. The computer-implemented method of claim 1, further comprising:
    detecting an event indicating that a position of at least one further monitor relative to a position of the at least one monitor is to be determined, wherein the at least one further monitor includes at least one speaker;
    driving the at least one speaker of the at least one further monitor with an acoustic signal;
    receiving the acoustic signal at the at least two microphones;
    analyzing the acoustic signal received at each of the at least two microphones from the at least one speaker;
    determining, based on the analysis, a relative position of the at least one further monitor relative to the at least one other monitor; and
    adjusting the extended desktop monitor configuration settings of the information handling system to position the at least one further monitor and the at least one other monitor in the relative position.

7. The computer-implemented method of claim 1, wherein
    the event indicating that a position of at least one monitor relative to a position of at least one other monitor is to be determined includes at least one of:
        connecting the at least one monitor to a video output of the information handling system; and
        entering a user input to the information handling system indicating that the position of the at least one monitor relative to the position of at least one other monitor is to be adjusted.

8. A system comprising:
    a processor;
    a data bus coupled to the processor; and
    a non-transitory, computer-readable storage medium embodying computer program code, the non-transitory, computer-readable storage medium being coupled to the data bus, the instructions being executable by the processor and configured for:
        detecting an event indicating that a position of at least one monitor relative to a position of at least one other monitor is to be determined, wherein
            the at least one monitor includes at least one speaker, and
            the at least one other monitor is configured in an information handling system having at least two microphones proximate the at least one other monitor;
        driving the at least one speaker with an acoustic signal;
        receiving the acoustic signal at the at least two microphones;

analyzing the acoustic signal received at each of the at least two microphones from the at least one speaker;

determining, based on the analysis, a relative position of the at least one monitor relative to the at least one other monitor; and adjusting extended desktop monitor configuration settings of the information handling system to position the at least one monitor and the at least one other monitor in the relative position.

9. The system of claim 8, wherein
the acoustic signal is at least one of a continuous tone or an acoustic pulse.

10. The system of claim 9, wherein
the continuous tone is an ultrasonic tone.

11. The system of claim 8, wherein
the analysis of the acoustic signal received at each of the at least two microphones includes at least one of:
  detecting a time at which an acoustic pulse signal is received at a first microphone of the at least two microphones with a time at which the acoustic pulse signal is received at a second microphone of the at least two microphones; and
  detecting a phase of a continuous tone received at a first microphone of the at least two microphones with a phase of the continuous tone received at a second microphone of the at least two microphones.

12. The system of claim 11, wherein
the determining includes at least one of:
  determining the relative position of the at least one monitor relative to the at least one other monitor by comparing the time at which the acoustic pulse signal is received at the first microphone of the at least two microphones with the time at which the acoustic pulse signal is received at the second microphone of the at least two microphones; and
  determining the relative position of the at least one monitor relative to the at least one other monitor by comparing the phase of the continuous tone received at the first microphone of the at least two microphones with the phase of the continuous tone received at the second microphone of the at least two microphones.

13. The system of claim 8, wherein the instructions are further configured for:
  detecting an event indicating that a position of the at least one further monitor relative to a position of the at least one other monitor is to be determined, wherein the at least one further monitor includes at least one speaker;
  driving the at least one speaker of the at least one further monitor with an acoustic signal;
  receiving the acoustic signal at the at least two microphones;
  analyzing the acoustic signal received at each of the at least two microphones from the at least one speaker;
  determining, based on the analysis, a relative position of the at least one further monitor relative to the at least one other monitor; and
  adjusting extended desktop monitor configuration settings of the information handling system to position the at least one monitor and the at least one further monitor in the relative position.

14. The system of claim 8, wherein
the event indicating that a position of at least one monitor relative to a position of at least one other monitor is to be determined includes at least one of:
  connecting the at least one monitor to a video output of the information handling system; and
  entering a user input to the information handling system indicating that the position of the at least one monitor relative to the position of at least one other monitor is to be adjusted.

15. A non-transitory, computer-readable storage medium embodying computer program code, the computer program code comprising computer-executable instructions configured for:
  detecting an event indicating that a position of at least one monitor relative to a position of at least one other monitor is to be determined, wherein
    the at least one monitor includes at least one speaker, and
    the at least one other monitor is configured in an information handling system having at least two microphones proximate the at least one other monitor;
  driving the at least one speaker with an acoustic signal;
  receiving the acoustic signal at the at least two microphones;
  analyzing the acoustic signal received at each of the at least two microphones from the at least one speaker;
  determining, based on the analysis, a relative position of the at least one monitor relative to the at least one other monitor; and
  adjusting extended desktop monitor configuration settings of the information handling system to position the at least one monitor and the at least one other monitor in the relative position.

16. The non-transitory, computer-readable storage medium of claim 15, wherein
the acoustic signal is at least one of a continuous tone or an acoustic pulse.

17. The non-transitory, computer-readable storage medium of claim 16, wherein
the continuous tone is an ultrasonic tone.

18. The non-transitory, computer-readable storage medium of claim 15, wherein
the analysis of the acoustic signal received at each of the at least two microphones includes at least one of:
  detecting a time at which an acoustic pulse signal is received at a first microphone of the at least two microphones with a time at which the acoustic pulse signal is received at a second microphone of the at least two microphones; and
  detecting a phase of a continuous tone received at a first microphone of the at least two microphones with a phase of the continuous tone received at a second microphone of the at least two microphones.

19. The non-transitory, computer-readable storage medium of claim 18, wherein
the determining includes at least one of:
  determining the relative position of the at least one monitor relative to the at least one other monitor by comparing the time at which the acoustic pulse signal is received at the first microphone of the at least two microphones with the time at which the acoustic pulse signal is received at the second microphone of the at least two microphones; and
  determining the relative position of the at least one monitor relative to the at least one other monitor by comparing the phase of the continuous tone received at the first microphone of the at least two microphones with the phase of the continuous tone received at the second microphone of the at least two microphones.

20. The non-transitory, computer-readable storage medium of claim 15, wherein the instructions are further configured for:
- detecting an event indicating that a position of the at least one further monitor relative to a position of the at least one other monitor is to be determined, wherein the at least one further monitor includes at least one speaker;
- driving the at least one speaker of the at least one further monitor with an acoustic signal;
- receiving the acoustic signal at the at least two microphones;
- analyzing the acoustic signal received at each of the at least two microphones from the at least one speaker;
- determining, based on the analysis, a relative position of the at least one further monitor relative to the at least one other monitor; and
- adjusting the extended desktop monitor configuration settings of the information handling system to position the at least one further monitor and the at least one other monitor in the relative position.

* * * * *